United States Patent [19]
Blinks et al.

[11] Patent Number: 4,602,706
[45] Date of Patent: Jul. 29, 1986

[54] DOUBLE WRAP BRAKE BAND

[75] Inventors: John C. Blinks, Lombard; Lauri J. Kivisto, Glen Ellyn, both of Ill.

[73] Assignee: Borg-Warner Corporation, Chicago, Ill.

[21] Appl. No.: 310,340

[22] Filed: Oct. 9, 1981

[51] Int. Cl.[4] .............................................. F16D 69/00
[52] U.S. Cl. ..................................... 188/259; 29/418; 192/107 T
[58] Field of Search ................... 188/250 H, 259, 249, 188/77 R, 77 W; 267/181; 192/107 T, 80; 29/418

[56] References Cited

U.S. PATENT DOCUMENTS

| 2,444,465 | 7/1948 | Peters | 29/412 |
| 2,704,882 | 3/1955 | Olson | 29/418 X |
| 2,768,714 | 10/1956 | Holdeman et al. | 188/77 R X |
| 2,841,864 | 7/1958 | Kelly | 29/418 |
| 2,867,898 | 1/1959 | Vosler et al. | 29/416 |
| 2,957,226 | 10/1960 | Dibner | 29/412 |
| 2,975,870 | 3/1961 | Vosler et al. | 188/77 |
| 3,386,535 | 6/1968 | Bishop et al. | 188/77 |
| 3,561,113 | 2/1971 | Burke | 29/412 |
| 3,926,359 | 12/1975 | Victory | 188/250 H X |
| 4,157,746 | 6/1979 | Body | 192/80 X |
| 4,363,385 | 12/1982 | Schlanger | 188/259 X |

FOREIGN PATENT DOCUMENTS

| 618500 | 2/1949 | United Kingdom | 188/77 R |
| 1348352 | 3/1974 | United Kingdom | 188/77 R |

Primary Examiner—George E. A. Halvosa
Attorney, Agent, or Firm—James A. Geppert

[57] ABSTRACT

An improved double wrap brake band for an automatic transmission and the method of making the band wherein the band is lightweight and heat set round at the released open position with the utilization of thinner strap material at higher hardness ranges. The band is formed from a preslotted and preformed strap and a stamped one-piece bracket member secured to the strap. The band subassembly is heat treated and heat set, the interior surface is acid etched and a preslotted friction lining applied to the interior treated surface, the subassembly is sized, and the connecting ties for both the strap and bracket member are removed to provide the final band assembly.

29 Claims, 20 Drawing Figures

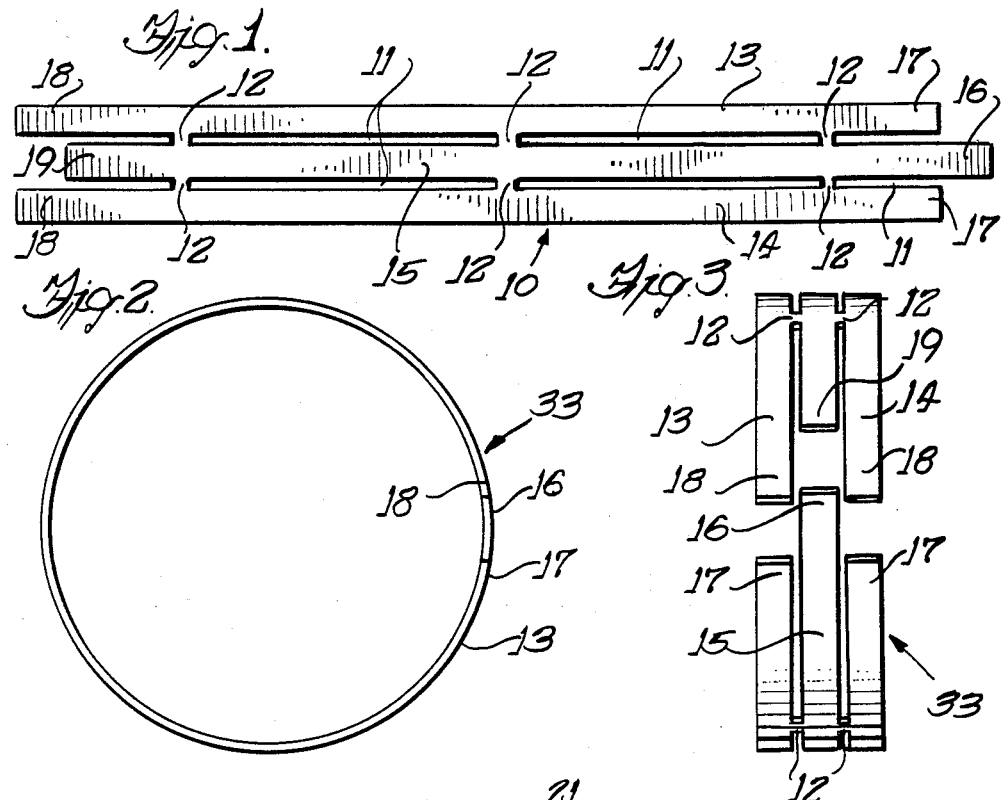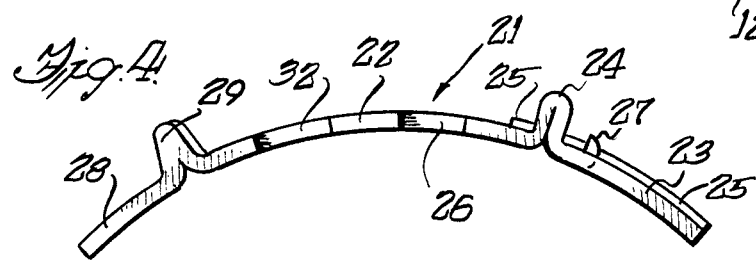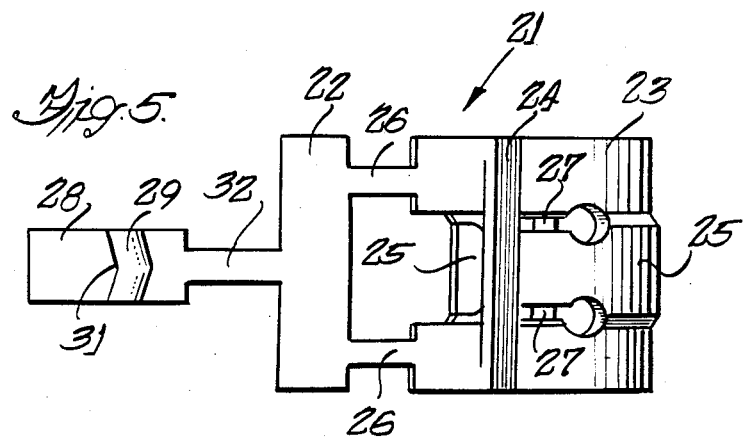

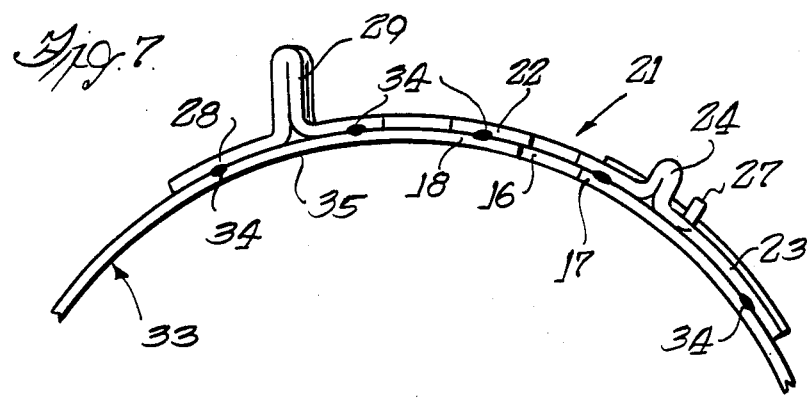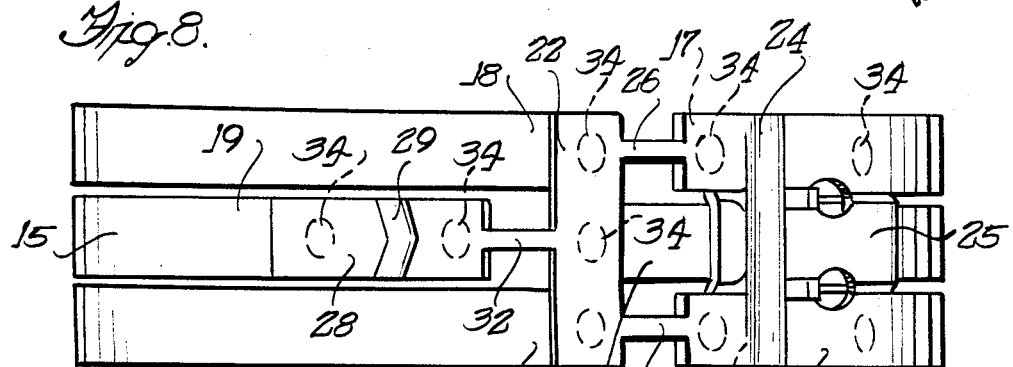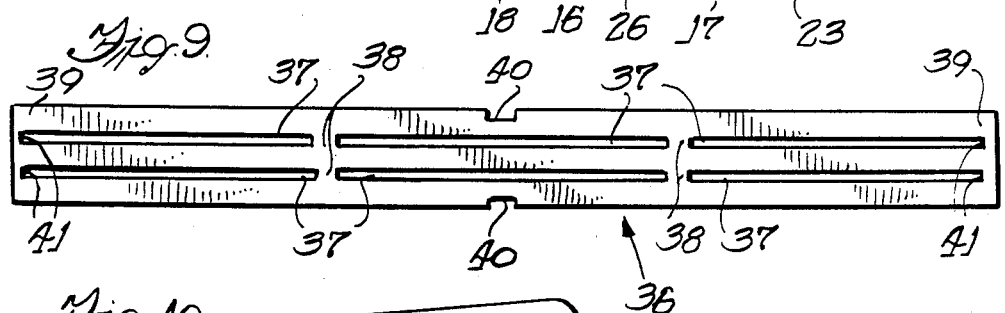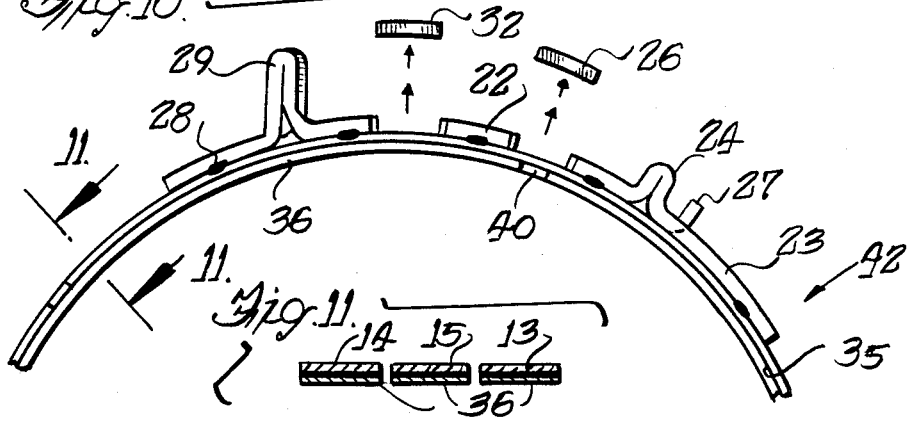

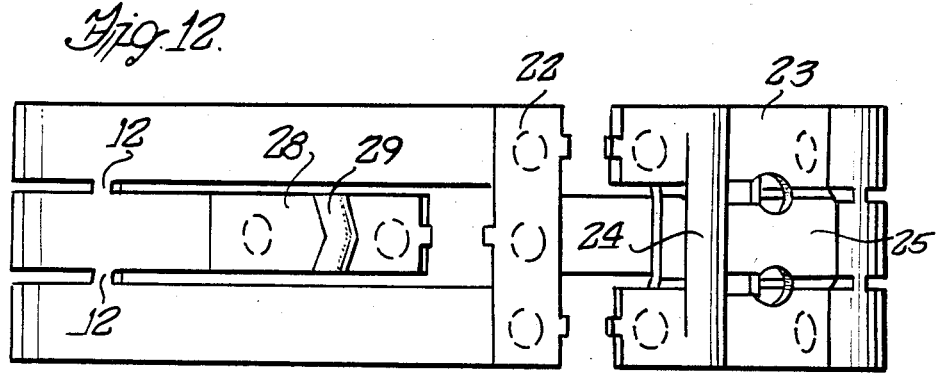
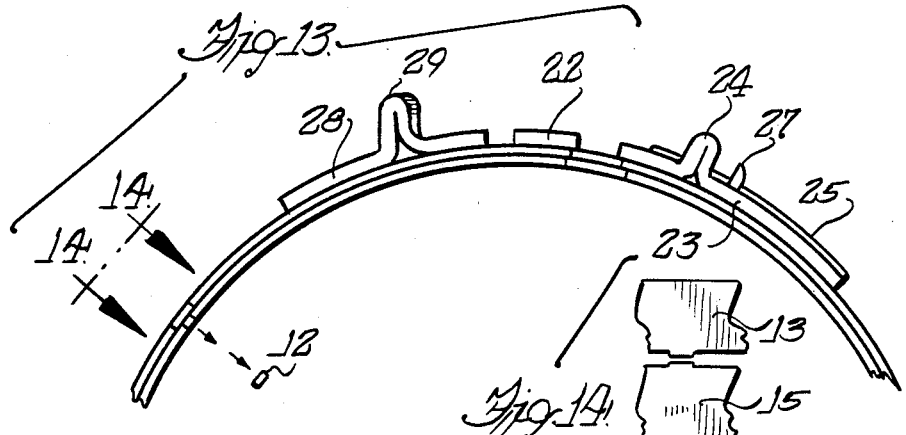
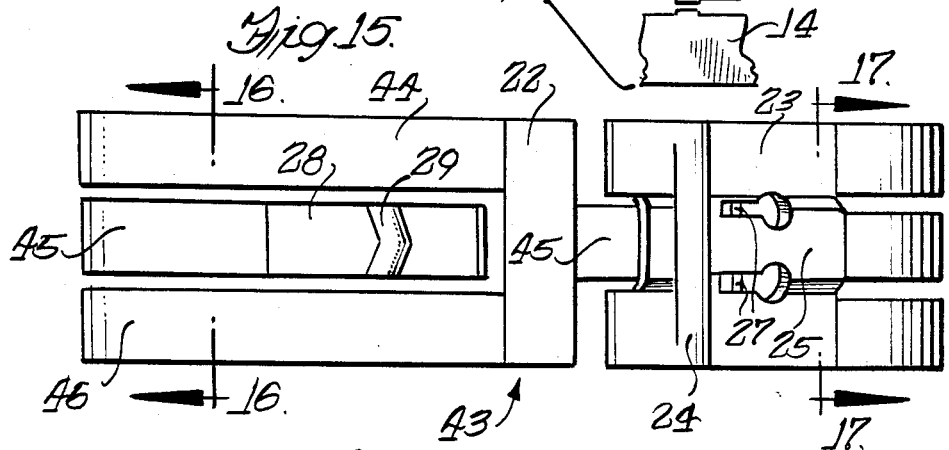

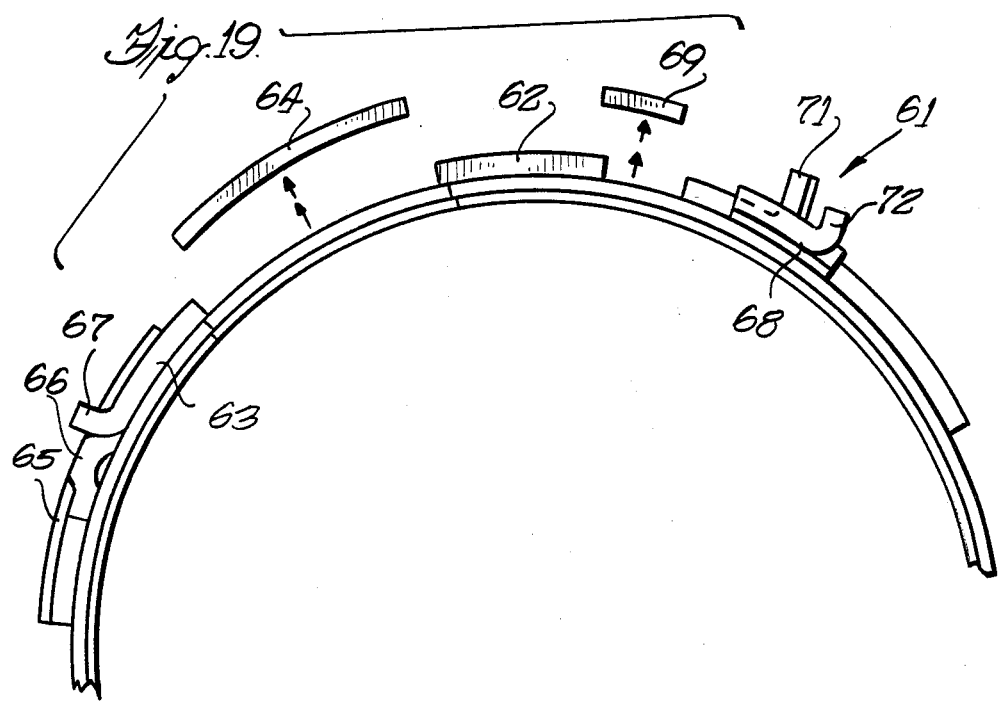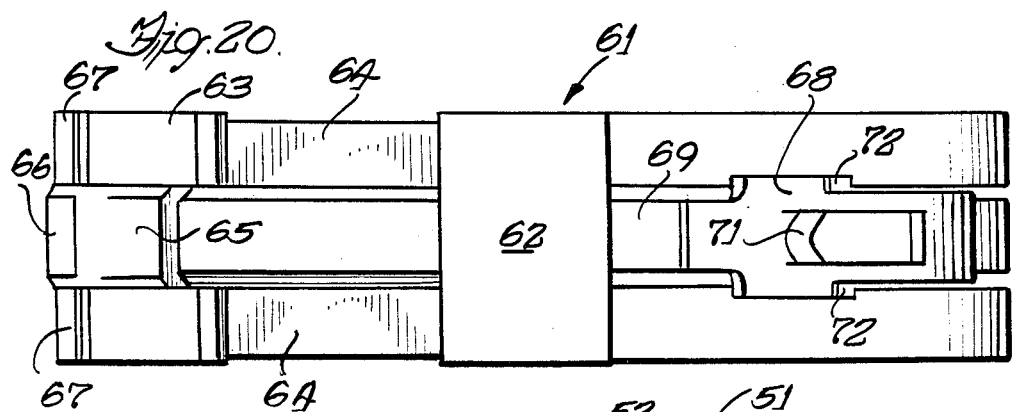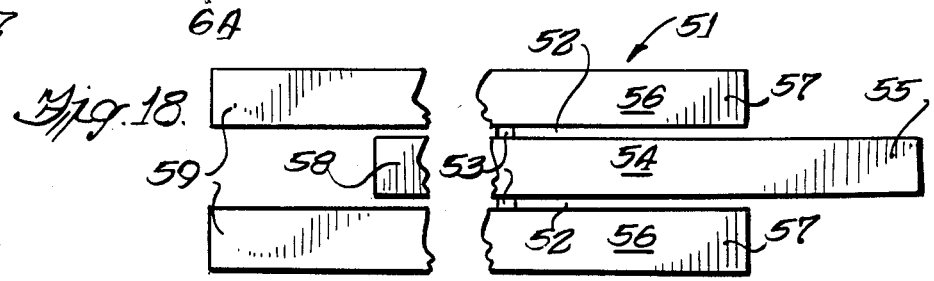

DOUBLE WRAP BRAKE BAND

BACKGROUND OF THE INVENTION

The present invention relates to an improved double wrap brake band and the method of making same for use in the automatic transmission of an automotive vehicle. In a conventional automatic transmission of the torque converter type, a driven shaft extends from the torque converter into the transmission to a unit having one or more clutch drums around which are placed double wrap brake bands; and more specifically, the double wrap bands are used for the 1-2 unit and for the reverse unit. It is the function of the brake bands under suitable hydraulic controls to effect gear change and control of the direction of rotation of the output or drive shaft from the transmission.

Presently manufactured double wrap brake bands are formed from a relatively thick metal strap and a forging or casting forming ears and a transverse tie for the band; the ears being engaged by the struts and a hydraulic piston in the transmission to actuate the band. The forging or casting is located in the space between the ends of the arcuate strap and the edges of the casting and strap are butt welded together. As seen in U.S. Pat. No. 2,867,898, once the bracket is welded to the strap, the assembly is expanded to size and shape, the bracket is transversely broached to form the transverse tie and ears separated by parallel slots and to form "V" slots in the ears to accommodate the struts, openings are pierced in the bottom wall of the broached slots, the interior surface of the assembly is shot peened and the friction lining is bonded to the surface. After bonding, openings are pierced in the friction material, the interior surface is bored, the friction lining is circumferentially grooved, and two circumferential slots are formed through the assembly, except the transverse tie, by sawing through the strap and lining to produce the three radially expansible bands.

The double wrap bands made by the above enumerated method have certain disadvantages in operation. The internal stesses created in the bands during manufacture will distort the bands so that they are not round in the released position. Thus, when assembled in an automatic transmission, there will be a certain amount of drag between the bands and its associated drum. Also, when the bands are actuated to engage the drum, a lack of concentricity of the outer and middle bands results in uneven engagement of the band. The double wrap brake band of the present invention obviates the disadvantages of the previously used bands.

SUMMARY OF THE INVENTION

The present invention comprehends the provision of an improved double wrap brake band which is formed from a preformed and preslotted stamped strap and a separate stamped one-piece bracket member. The band and bracket are formed from thinner gauge sheet metal for improved cost and lighter weight with the material having a higher hardness range. The bracket and strap are secured together, and the assembly is heat set round in the released position to decrease the drag of the band on the clutch drum when the band is released.

The present invention also comprehends the provision of an improved double wrap brake band utilizing a preslotted non-asbestos friction lining. Less material is required for the band, and there is better axial alignment of the outside and middle bands in the free position. Also, there is a better engaged conformity of the double wrap band with all three bands in substantially uniform engagement with the clutch drum.

The present invention further comprehends the provision of a unique one-piece bracket member for joining the free ends of the preslotted strap together. The bracket member comprises an anchor portion having a central bridging section, a transverse connecting bar and an apply portion; all joined together by longitudinally extending generally parallel ties. The bridging section of the anchor portion connects the anchor ends of the outer bands together to improve the alignment of the straps and thereby improves engagement of the band. Also, the transverse connecting bar is secured to the static ends of all three bands formed from the strap.

The present invention further comprehends the provision of an improved process for the manufacture of the double wrap band. A preslotted strap is formed into a curved configuration and a preslotted metal bracket member is spot welded to the strap; both the strap and bracket having tie portions retaining a unitary assembly. The assembly is heat treated, heat set and the interior surface prepared for bonding. A preslotted friction lining is bonded to the interior surface of the band, and the ties in the strap and bracket are removed to provide the final double wrap band.

Further objects are to provide a construction of maximum simplicity, efficiency, economy and ease of operation, and such further objects, advantages and capabilities as will later more fully appear and are inherently possessed thereby.

DESCRIPTION OF THE DRAWINGS

FIG. 1 is a top plan view of the preslotted strap forming the double wrap band.

FIG. 2 is a side elevational view of the strap in a curved condition.

FIG. 3 is a top plan view of the curved strap.

FIG. 4 is a side elevational view of the bracket member for the band.

FIG. 5 is a top plan view of the bracket member.

FIG. 7 is a partial side elevational view of the assembled strap and bracket secured together.

FIG. 8 is a top plan view of the assembly.

FIG. 9 is a top plan view of the preslotted friction lining for the band.

FIG. 10 is a side elevational view of the band assembly with the bracket ties being removed.

FIG. 11 is a cross sectional view taken on the line 11—11 of FIG. 10.

FIG. 12 is a top plan view of the band assembly with the bracket tie straps removed.

FIG. 13 is a side elevational view of the band assembly with the strap ties removed.

FIG. 14 is a top plan view of a portion of the band showing the strap ties removed.

FIG. 15 is a top plan view of the final band assembly.

FIG. 16 is a cross sectional view taken on the line 16—16 of FIG. 15.

FIG. 18 is a top plan view of a strap for a reverse band.

FIG. 19 is a side elevational view of the bracket and strap with the bracket ties removed.

FIG. 20 is a top plan view of the assembled bracket and strap.

DESCRIPTION OF THE PREFERRED EMBODIMENTS

Figure 6:
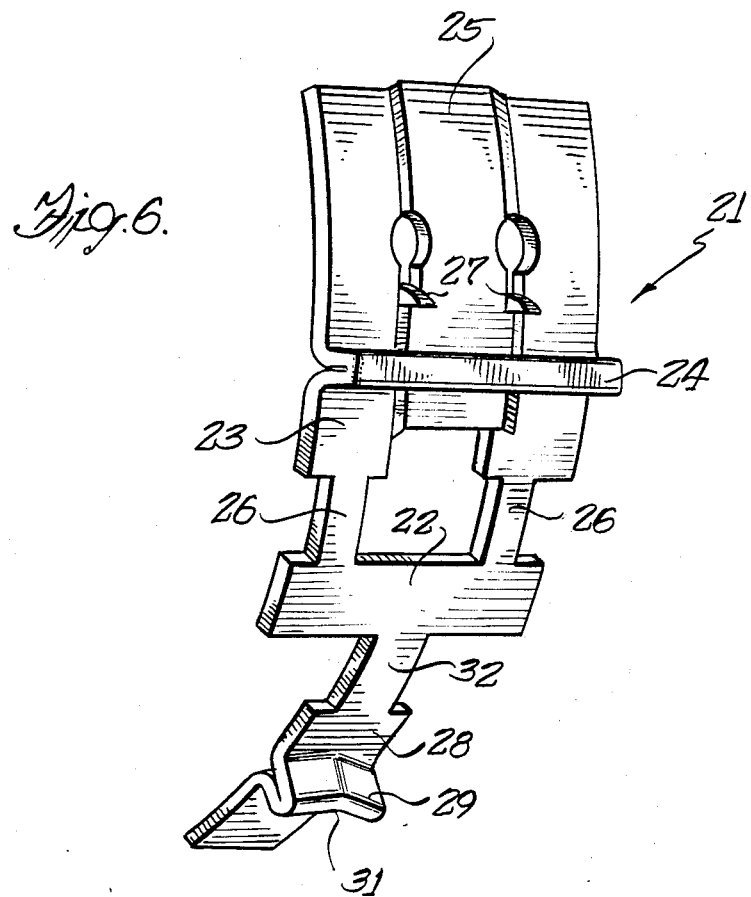
FIG. 6 is an enlarged perspective view of the bracket member.
Figure 17:
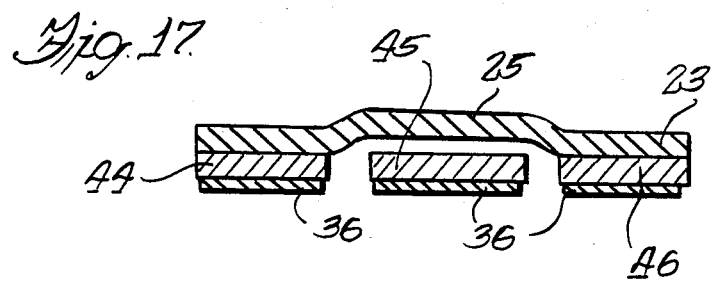
FIG. 17 is a cross sectional view taken on the line 17—17 of FIG. 15.

Referring more particularly to the disclosure in the drawings wherein are shown illustrative embodiments of the present invention, FIG. 1 discloses the preslotted flat strap 10 which forms the basis for the final double wrap brake band. The strap includes two parallel lines of elongated slots 11 separated by transversely aligned ties 12 to form parallel outside bands or band segments 13 and 14 and a middle band or band segment 15. One end 16 of the middle band extends beyond the ends 17,17 of the outside band, while at the opposite end, the ends 18,18 of the outside bands project beyond the end 19 of the middle band. The slotted band is formed into a curved member 33 (FIGS. 2 and 3).

An important aspect of the present invention resides in a one-piece anchor bracket member 21 (FIGS. 4, 5 and 6) formed by stamping the bracket member from sheet metal to provide a longitudinally curved member. The bracket member 21 includes a central transverse connecting bar portion 22 having a width equal to the width of the strap 10, an anchor portion 23 extending the width of the strap and having an upwardly folded or crimped ridge 24 and a raised central bridging section or portion 25 on each side of and extending under the crimped, convex ridge 24; the anchor portion being integral with the transverse connecting bar portion 22 through a pair of parallel ties 26,26. The anchor portion 23 of bracket member 21 serves the unique purpose of connecting the anchor ends 17,17 of the outer bands 13 and 14 to improve the alignment of the bands 13,14 during engagement. A pair of upwardly bent positioning tabs 27,27 are stamped out of the anchor portion adjacent but rearwardly of the folded ridge 24; the tabs or ears 27 functioning as locating members. Extending from the opposite side of the transverse connecting bar portion 22 is a centrally located longitudinally extending apply portion 28 having an upwardly crimped or folded lip 29 with an indented central area 31; the apply portion being attached to the transverse bar portion 22 by a tie 32.

The anchor bracket member 21 is a one-piece stamping that is located on the ends of the strap 10 when it is formed or curved into a generally arcuate member 33 with the central band 15 extending under the raised bridging section 25 of the bracket member. The bracket member is spot welded as at 34 to the ends 16,19 of the middle band and the ends 17,17,18,18 of the outer bands (FIGS. 7 and 8). After spot welding, the bracket and curved strap may be copper brazed together to improve the reliability over a simple welded assembly.

After spot welding and/or brazing at a temperature in the range of 2030° to 2050° F., the assembly is held for five minutes at the elevated temperature and then heat treated by heating to a temperature in the range of 1550° to 1700° F. and quenched in hot or cold (100° F.-350° F.) oil to provide a Rockwell C scale hardness of 54 to 58. Then the assembly is predrawn at a temperature of approximately 400° F. for about 35 minutes to a Rockwell C scale hardness of 50 to 54. Finally, the assembly is heat set to the desired diameter over an expanding fixture at a temperature in the range of 700° to 740° F. over a time period of 20 to 30 minutes to produce a Rockwell C scale hardness of 40 to 45.

A preslotted non-asbestos friction lining 36 (FIG. 9) is applied to the interior surface 35 of the band assembly after the surface is prepared by an acid etch or other suitable surface preparation. The lining also is formed with elongated longitudinal parallel slots 37 separated by transverse ties 38. The ends 39 of the bands formed by the slots are also joined by ties 41 rather than the open slots of the strap 10. The lining is bonded to the surface 35 by a suitable adhesive at a temperature in the range of 400° to 440° F. at the bond line for two minutes with the ties 38 aligned with the ties 12 of the strap 10 and positioning notches 40 aligned with the ties 26 of the bracket member; the ends of the lining being positioned substantially diametrically opposite to the bracket member 21.

Once the lining is bonded to the band assembly to form the assembly 42, the ties 26,26 joining the portion 23 to the connecting bar portion 22 and the tie 32 joining the apply portion 29 to the bar portion are cut out (FIGS. 10, 11 and 12). Then the ties 12 and 38 in the strap and liner, respectively, are removed by punching or other suitable operation (FIGS. 13 and 14) to form the interconnected three bands 44,45,46 of the final assembly 43 (FIG. 15). This assembly has a better alignment of the bands due to the interconnection of the anchor ends 17,17 of the outer bands 44 and 46 by the bridging section 25 in the free or released position to provide greater roundness and thus less drag between the bands and the clutch drum. Also, when the band is applied to the drum, engagement is more uniform throughout the three parallel bands 44,45,46. Obviously, the ties 12 and 38 in the band could be initially removed followed by the bracket ties 26 and 32 to obtain the same result.

FIG. 18 discloses an elongated strap 51 to form the reverse double wrap band which is generally similar to the strap 10 in having longitudinally extending slots 52 with transverse ties 53; however, the end 55 of the central band 54 extends farther beyond the ends 57 of the outside bands 56 at the one end and, at the opposite end, the ends 59 of the outer bands extend farther beyond the end 58 of the central band. Likewise the bracket member 61 (FIGS. 19 and 20) of the reverse band is more elongated with a connecting bar portion 62, an anchor portion 63 connected to the bar portion by a pair of elongated ties 64, and an apply portion 68 connected to the bar portion 62 by a single elongated tie 69. The anchor portion 63 is formed with a central circumferentially extending raised bridging section 65 having an upwardly bent convex portion 66, and a pair of upwardly bent ears 67,67 punched out of the member aligned with the outer bands 56 of the elongated strap 51 to receive anchor struts or pins thereagainst.

The apply portion 68 includes a punched out concave central upwardly extending lip 71 and a pair of punched out side tabs 72,72 slightly rearwardly and laterally of the lip 71 to positively locate the apply piston pin (not shown) against the lip 71; the tabs 72,72 preventing lateral misalignment of the piston. The process of forming the final double wrap band assembly for the reverse band is substantially the same as described and shown in FIGS. 1 through 17.

TECHNICAL ADVANTAGES

The present double wrap brake band and the method of making the same has several technical advantages over presently manufactured double wrap bands as follows:

1. Less material is utilized for the band and bracket to provide a lighter weight unit.

2. Lower running drag loss on the drum with the band in the open position.

3. An improved fatigue life for the band resulting from utilization of a higher hardness range.

4. Where the bracket and strap are brazed together, there is improved reliability over a welded only assembly.

5. Better alignment of the bands in open position and better engaged conformity.

6. The assembly has a lower unit cost as stampings are used instead of forgings and all machining operations are eliminated.

7. There is an improved bonding of the friction lining to the band.

8. A more uniform product is achieved.

9. A non-asbestos band lining is utilized.

We claim:

1. A double wrap brake band comprising three substantially parallel curved bands joined by a sheet metal bracket member to form a substantially round double wrap band, the bracket member including a transverse connecting bar portion joined to the ends of all three bands, an anchor portion joined to the ends of the outside bands and having a raised central bridging section to allow the central band to pass thereunder, and an apply portion joined to the end of the central band; the outside bands extending from the connecting bar portion in one direction and the central band extending from the bar portion in the opposite direction of rotation, said apply portion having a lip adapted to receive the end of an actuating piston, and said anchor portion having at least one ridge extending at least partially across the anchor portion with at least one upwardly bent locating member.

2. A double wrap brake band as set forth in claim 1, in which said bracket member is formed from a sheet metal stamping.

3. A double wrap brake band as set forth in claim 1, in which said bands are formed from a preslotted sheet metal strap.

4. A double wrap brake band as set forth in claim 1, in which said apply lip has a concave surface facing the actuating piston.

5. A double wrap brake band as set forth in claim 4, in which said apply lip comprises an upwardly folded portion of the apply portion with a central indentation therein.

6. A double wrap brake band as set forth in claim 4, in which said apply lip comprises an upwardly bent ear in the apply portion, and a pair of upwardly bent locating tabs positioned laterally and rearwardly of the apply lip.

7. A double wrap brake band as set forth in claim 1, in which said anchor portion ridge comprises an upwardly folded portion extending transversely across said anchor portion.

8. A double wrap brake band as set forth in claim 7, including a pair of upwardly bent tabs in the anchor portion rearwardly of said ridge.

9. A double wrap brake band as set forth in claim 1, in which said anchor portion ridge comprises a pair of upwardly bent tabs in the anchor portion and aligned with the outside bands.

10. A double wrap brake band as set forth in claim 9, including an upwardly bent convex transverse portion located rearwardly of said anchor tabs and aligned with said central band.

11. An intermediate assembly in the process of forming a double wrap brake band including an elongated curved sheet metal strap having longitudinally extending elongated parallel slots separated by transverse ties and generally defining three parallel bands, said slots opening into both ends of the strap, and an anchor bracket member secured to the opposite ends of the strap, said bracket member including a transverse connecting bar portion, a transverse anchor portion joined to the connecting bar portion by parallel ties, and a central apply portion on the opposite side of the connecting bar portion and attached thereto by a longitudinally extending tie.

12. An intermediate assembly as set forth in claim 11, wherein a friction lining is bonded to the interior surface of said strap, said lining comprising an elongated strip of friction material having longitudinally extending elongated parallel slots therein separated by transverse ties, said slots and ties of the friction material corresponding to the slots and ties of said metal strap.

13. An intermediate assembly as set forth in claim 11, in which the end of said central band extends beyond the ends of the outside bands at one end of said strap, and the ends of the outside bands extend beyond the end of the central band at the opposite end of the strap.

14. An intermediate assembly as set forth in claim 1, in which said anchor portion includes an upwardly folded transversely extending anchor ridge and a pair of laterally spaced upwardly bent tabs rearwardly of said ridge, and said apply portion includes an upwardly folded transverse apply lip having a central indentation facing away from said connecting bar portion.

15. An intermediate assembly as set forth in claim 11, in which said anchor portion includes a pair of upwardly bent ears aligned with said outside bands and a central upwardly bent convex transverse ridge rearwardly of said ears and aligned with said central band, and said apply portion includes an upwardly bent apply ear having a concave surface facing away from said connecting bar portion and a pair of upwardly bent tabs formed outwardly and rearwardly of said apply ear.

16. An intermediate assembly as set forth in claim 11, wherein said connecting bar portion is secured to the ends of the outer bands at one end of the strap and the opposite end of the central band, said anchor portion is secured to the opposite ends of the outer bands and has a raised central bridging section receiving the central band thereunder, and the apply portion is connected to the one end of the central band.

17. A one-piece bracket member adapted for use in the manufacture of a double wrap brake band, said one-piece bracket member being formed from sheet metal and having a transverse connecting bar portion, an anchor portion and an apply portion connected by longitudinally extending ties, said anchor portion having a ridge extending transversely across the bracket member, the bracket member portions being adapted for welding to the opposite ends of an elongated flat strap.

18. A bracket member as set forth in claim 17, wherein a lip is formed in the apply portion by folding of the sheet metal of the bracket member.

19. A bracket member as set forth in claim 18, in which said apply lip has a central indentation therein.

20. A bracket member as set forth in claim 17, wherein said apply portion includes an upwardly bent ear in the member, and a pair of upwardly bent locating tabs positioned laterally and rearwardly of the bent ear.

21. A bracket member as set forth in claim 17, in which said anchor portion ridge comprises an upwardly folded portion extending transversely across said anchor portion.

22. A bracket member as set forth in claim 21, including a pair of upwardly bent tabs in the anchor portion rearwardly of said ridge.

23. A bracket member as set forth in claim 17, in which said anchor portion ridge comprises a pair of upwardly bent ears in the anchor portion and aligned with the outside bands of the strap.

24. A bracket member as set forth in claim 23, including an upwardly bent convex transverse portion located rearwardly of said anchor ears and aligned with the central band of the strap.

25. A bracket assembly as set forth in claim 17, wherein said anchor portion has a raised central bridging section joining the outer anchor sections of the anchor portion.

26. A one-piece bracket member adapted for use in the manufacture of a double wrap brake band, said one-piece bracket member being formed from sheet metal and having a transverse connecting bar portion, an anchor portion and an apply portion connected by longitudinally extending ties, a pair of generally parallel ties joining the transverse connecting bar and anchor portions and a single tie joining the transverse connecting bar and apply portions, said anchor portion having a ridge extending transversely across the bracket member, the bracket member portions being adapted for welding to the opposite ends of an elongated flat strap.

27. A bracket member as set forth in claim 26, wherein a lip is formed in the apply portion by folding of the sheet metal of the bracket member.

28. A bracket member as set forth in claim 27, in which said apply lip has an indented central area therein.

29. A bracket member as set forth in claim 26, wherein said apply portion includes an upwardly bent ear in the member, and a pair of upwardly bent locating tabs positioned laterally and rearwardly of the bent ear.

* * * * *